United States Patent [19]

Lühmann et al.

[11] Patent Number: 4,659,387

[45] Date of Patent: Apr. 21, 1987

[54] NITROCELLULOSE MOISTENED WITH TERTIARY ALCOHOLS AND THE USE THEREOF IN POLYURETHANE LACQUERS

[75] Inventors: Erhard Lühmann, Bomlitz; Lutz Hoppe, Walsrode, both of Fed. Rep. of Germany

[73] Assignee: Wolff Walsrode AG, Walsrode, Fed. Rep. of Germany

[21] Appl. No.: 760,373

[22] Filed: Jul. 30, 1985

[30] Foreign Application Priority Data

Aug. 18, 1984 [DE] Fed. Rep. of Germany ....... 3430437

[51] Int. Cl.[4] ............................................. C08L 1/18
[52] U.S. Cl. ....................................... 106/195; 149/2; 149/100; 524/32; 524/716; 524/871
[58] Field of Search ..................... 106/195; 536/35, 38, 536/42; 149/2, 100; 524/32, 716, 871

[56] References Cited

U.S. PATENT DOCUMENTS

| | | | |
|---|---|---|---|
| 1,398,911 | 11/1921 | Seel | 536/38 |
| 3,284,253 | 11/1966 | Enders et al. | 149/2 |
| 3,925,125 | 12/1975 | Cox et al. | 149/2 |
| 3,985,691 | 10/1976 | Taffin et al. | 524/716 |
| 4,460,411 | 7/1984 | Ohtake et al. | 106/195 |

FOREIGN PATENT DOCUMENTS

| | | | |
|---|---|---|---|
| 325254 | 2/1930 | United Kingdom | 536/42 |
| 2067568 | 7/1981 | United Kingdom | 106/195 |

OTHER PUBLICATIONS

Industrial and Engineering Chemistry, vol. 28, No. 3, pp. 312–316.
Handbook of Chemistry and Physics, 33rd Edition, Published by Chemical Rubber Publishing Co., Cleveland, Ohio, 1951, pp. 786–787.

*Primary Examiner*—Ronald W. Griffin
*Attorney, Agent, or Firm*—Sprung, Horn, Kramer & Woods

[57] ABSTRACT

Nitrocellulose moistened with alcohol, particularly for polyurethane lacquers, characterized in that a lower aliphatic tertiary alcohol is used as moistening agent.

8 Claims, No Drawings

NITROCELLULOSE MOISTENED WITH TERTIARY ALCOHOLS AND THE USE THEREOF IN POLYURETHANE LACQUERS

It is known to incorporate nitrocellulose in polyurethane lacquers, thereby the dispersibility of the pigments and the smoothness of the coating being improved and the drying time reduced. Since nitrocellulose in a dry state may be easily ignited by impact or friction, a moistening agent must be added to commercial nitrocelluloses, so as to reduce the risk of fire during storage and handling, as well as during transportation. Lower alcohols, for example alcohols, such as methanol, ethanol, isopropanol or n-butanol, are suitable as such moistening agents.

On adding such moistened nitrocelluloses to polyurethane lacquers, the problem exists that the alcohol in the nitrocellulose reacts with the isocyanate groups. By the reaction of the isocyanates with alcohol, the cross-linking reactions necessary for hardening the coating are reduced and low molecular weight compounds are formed which have the effect of softeners. The quality of a polyurethane coating is thereby impaired. Thus, for addition to polyurethanes, nitrocellulose is preferred which does not contain isocyanate-reactive compounds, particularly alcohols, which produce low molecular weight compounds on reaction with isocyanates.

So as to obviate these disadvantages, it is recommended according to the prior art to process nitrocellulose after production or commercial nitrocellulose in such a manner that it may be used for polyurethane lacquers. Thus according to the teaching of DE-OS No. 3,041,085, nitrocellulose, moistened after production with an alcohol and/or water, is dissolved and distilled in a solvent for nitrocellulose or in an azeotropic mixture of solvent and nonsolvent for nitrocellulose, so as to separate the alcohol and/or water.

This process for the production of nitrocellulose moistened with liquid hydrocarbons is for safety-technical reasons very questionable and very cost intensive.

This also applies to the processes described in U.S. Pat. No. 3,284,253 for the production of nitrocellulose moistened with liquid hydrocarbons, which is used in polyurethane lacquers. Here too, the separation of water takes place by azeotropic distillation.

Surprisingly, it is now possible to avoid this cost intensive treatment of the water- and alcohol-moistened nitrocellulose and at the same time to provide a useful polyurethane lacquer component, which does not lead to a reduction in lacquer quality, by treating the water-moistened nitrocellulose after production with liquid t-alcohols. For liquification, the t-alcohols are heated to melting point or known small quantities of water or corresponding unbranched alcohol are added. In the case of t-butanol, a temperature of at least 25° C. is necessary or the additon of from 1 to 4% of water is sufficient.

The present invention thus provides a nitrocellulose moistened with alcohol, which can be stored safefully and can be used as component for polyurethane lacquers, characterised in that a lower aliphatic t-alcohol is used as moistened agent.

The removal of the water by the alcohol from the water-moistened nitrocellulose during production may be carried out according to the known processes. It preferably takes place according to the method described in DE-OS No. 1,153,663, according to which the water is continuously expelled in a thrust centrifuge having a perforated base in counter- current to the moistening agent.

Every water-moistened nitrocellulose having a nitrogen content of from 10.2 to 12%, by weight, may be used in all viscosity stages as starting nitrocellulose.

As aliphatic t-alcohols, those are preferably used which are up to $C_6$, particularly preferably t-butanol. For use as polyurethane lacquer component, the moistening content with t-alcohol should be at least 25%, by weight, based on dry nitrocellulose. For the production of a polyurethane lacquer mixture, from 1 to 30%, by weight, preferably from 3 to 20%, by weight, based on the total lacquer mixture, of moistening nitrocellulose according to the present invention is used.

EXAMPLES

Lacquers having the following composition are produced:

| Lacquer mixture | 1*<br>%, by weight | 2<br>%, by weight |
|---|---|---|
| nitrocellulose of the standard 24 E (astro) | 14.4 | 14.4 |
| isopropanol | 7.8 | — |
| t-butanol | — | 7.8 |
| ethyl acetate | 73.0 | 73.0 |
| aliphatic isocyanate (75% in ethyl glycol aceate) | 4.8 | 4.8 |

*comparative mixture

The lacquers are stored for 1h respectively 7 days at 25° C.

After the given storage time, 15 g of hydroxyl group-containing polyacrylate resin (60% in xylol) are added to each lacquer and the viscosity is determined by time using a DIN 4-cup.

| viscosity measurement according to | storage 1 h<br>Din 4-outflow time in (s) | | storage 7 days<br>Din 4-outflow time in (s) formulation | |
|---|---|---|---|---|
| | 1* | 2 | 1* | 2 |
| 0 days | 32 | 32 | 40 | 40 |
| 1 day | 35 | 35 | 40 | 50 |
| 2 days | 32 | 41 | 40 | 64 |
| 4 days | 34 | 107 | 40 | 98 |
| 6 days | 35 | gel | 40 | gel |
| 8 days | 36 | — | 40 | — |
| 10 days | 36 | — | 40 | — |
| 30 days | 48 | — | 41 | — |

*comparative example

It may clearly be seen from the Table that the lacquer formulation 1 does not lead to a usable lacquer, since no increase in viscosity takes place.

Lacquer films, produced from the lacquer mixture 2 show the necessary hardness, chemicaly stability and adhesion.

We claim:

1. A nitrocellulose which comprises a moistening agent comprising a lower aliphatic tertiary alcohol, said moistening agent being present in an amount of at least 25% by weight, based on dry weight.

2. Nitrocellulose as claimed in claim 1 wherein the moistening agent is a t-butanol.

3. Nitrocellulose as claimed in claim 1, wherein the lower aliphatic tert.-alcohol contains small amounts of water or a lower unbranched aliphatic alcohol.

4. A nitrocellulose according to claim 1, wherein the lower aliphatic tertiary alcohol has up to 6 carbon atoms.

5. A polyurethane lacquer composition which comprises a nitrocellulose as claimed in claim 1.

6. A polyurethane lacquer composition according to claim 5, wherein the nitrocellulose is present in an amount of 1 to 30 weight %, based on the total lacquer weight.

7. A polyurethane lacquer composition according to claim 5, wherein the nitrocellulose is present in an amount of 3 to 20 weight %, based on the total lacquer weight.

8. A polyurethane lacquer composition according to claim 5, wherein the moistening agent comprises tert.-butanol.

* * * * *